United States Patent
Takahata et al.

(10) Patent No.: US 8,964,268 B2
(45) Date of Patent: Feb. 24, 2015

(54) SHEET-FEEDING DEVICE THAT SMOOTHLY FEEDS SHEETS IN MULTIPLE DIRECTION

(71) Applicants: Muneaki Takahata, Toyoake (JP);
Takashi Ohama, Iwakura (JP)

(72) Inventors: Muneaki Takahata, Toyoake (JP);
Takashi Ohama, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 62 days.

(21) Appl. No.: 13/629,767

(22) Filed: Sep. 28, 2012

(65) Prior Publication Data
US 2013/0170001 A1 Jul. 4, 2013

(30) Foreign Application Priority Data
Dec. 28, 2011 (JP) ................................. 2011-287875

(51) Int. Cl.
*H04N 1/04* (2006.01)

(52) U.S. Cl.
USPC ........ 358/498; 271/3.01; 271/3.05; 271/3.14; 271/213; 271/220

(58) Field of Classification Search
CPC .......... H04N 1/00612; H04N 1/00715; H04N 1/00734; H04N 2201/0081; B65H 2405/1117; B65H 2405/324; B65H 2405/111646; B65H 2405/3322; B65H 2801/06; B65H 31/02; B65H 31/04; B65H 31/20; B65H 3/0684
USPC ............... 358/488, 498; 271/3.14, 3.01, 3.05, 271/4.01, 213, 220, 223
See application file for complete search history.

(56) References Cited

U.S. PATENT DOCUMENTS

| | | | |
|---|---|---|---|
| 6,428,000 B1 * | 8/2002 | Hara et al. ..................... | 271/213 |
| 6,547,288 B1 | 4/2003 | Ito et al. | |
| 6,612,561 B2 | 9/2003 | Sekine | |
| 6,697,177 B1 * | 2/2004 | Tomoe et al. ................. | 358/498 |

(Continued)

FOREIGN PATENT DOCUMENTS

| | | |
|---|---|---|
| CN | 1126144 A | 7/1996 |
| CN | 1952797 A | 4/2007 |

(Continued)

OTHER PUBLICATIONS

English Machine Translation of JP H09-040187-A (Kimizuka, Published Feb. 10, 1997).*

(Continued)

*Primary Examiner* — Benny Q Tieu
*Assistant Examiner* — Juan M Guillermety
(74) *Attorney, Agent, or Firm* — Banner & Witcoff, Ltd.

(57) ABSTRACT

A sheet feeding device is formed with a sheet mounting part, and a sheet feeding unit defining a sheet feed path having inlet and outlet. The sheet feeding unit is configured to introduce the sheet on the sheet mounting surface from the inlet, feed the sheet along the feed path, and discharge the sheet from the outlet onto the sheet mounting part. The sheet mounting part includes first and second members arranged next to each other. The first and second members with a border therebetween define a sheet mounting surface. An end portion of one of the first and second members has one or more protruded portions, while an end portion of the other member has one or more slits configured to receive the one or more protruded portions. An upper surface of the one member is located at a higher position than the upper surface of the other member.

19 Claims, 4 Drawing Sheets

(56) References Cited

U.S. PATENT DOCUMENTS

| | | | |
|---|---|---|---|
| 7,434,801 | B2 | 10/2008 | Yang |
| 7,938,390 | B2 | 5/2011 | Shingai |
| 7,963,516 | B2 * | 6/2011 | Bokelman et al. ............ 271/213 |
| 2002/0056957 | A1 | 5/2002 | Sekine |
| 2007/0090587 | A1 | 4/2007 | Yang |
| 2007/0109614 | A1 * | 5/2007 | Iwago et al. ................. 358/498 |
| 2009/0189328 | A1 * | 7/2009 | Ohama et al. ................ 271/3.14 |
| 2009/0218749 | A1 * | 9/2009 | Shingai ........................ 271/3.14 |
| 2009/0278302 | A1 | 11/2009 | Bokelman et al. |

FOREIGN PATENT DOCUMENTS

| | | |
|---|---|---|
| CN | 101539734 A | 9/2009 |
| JP | 62-86357 U | 6/1987 |
| JP | 07-002345 | 1/1995 |
| JP | H09-40187 A | 2/1997 |
| JP | 11-227992 | 8/1999 |
| JP | 2001220047 A | 8/2001 |
| JP | 2002-145457 | 5/2002 |
| JP | 2005-225647 A | 8/2005 |
| JP | 2007-238285 A | 9/2007 |

OTHER PUBLICATIONS

English Machine Translation of JP 2005-225647-A (Sakuma, Published Aug. 25, 2005).*

English Machine Translation of JP 2007-238285-A (Hayama, Published Sep. 20, 2007).*

Dec. 9, 2014—(JP) Notification of Reasons for Rejection—Application No. 2011-287875.

Dec. 12, 2014—(CN) The First Office Action—Application No. 201210366448.6.

* cited by examiner

SHEET-FEEDING DEVICE THAT SMOOTHLY FEEDS SHEETS IN MULTIPLE DIRECTION

CROSS-REFERENCE TO RELATED APPLICATION

This application claims priority under 35 U.S.C. §119 from Japanese Patent Application No. 2011-287875 filed on Dec. 28, 2011. The entire subject matter of the application is incorporated herein by reference.

BACKGROUND

1. Technical Field

Aspects of the present invention relate to a sheet feeding device configured to feed a sheet along a predetermined sheet feed path, and an image scanning device employing such a sheet feeding device.

2. Prior Art

An image scanning device provided with an ADF (Automatic Document Feeders), and an openable/closeable sheet feed trays on which originals are placed has been known.

The conventional image scanning device as described above is configured such that the sheet feed tray is rotatable (mostly foldable) with respect to a housing thereof such that the sheet feed tray is rotated to close a sheet inlet when the ADF is not used.

Between the sheet inlet and the sheet feed tray, a sheet passing surface, which is provided with side regulation members, is formed. An area from the sheet passing surface to the sheet feed tray is used as a sheet placing surface on which the original sheet subjected to be fed by the ADF is placed.

When the sheet placing surface is formed with two members such as the sheet feed tray and the sheet passing surface described above, if there is a step or a gap at a border between the two members, a leading end of the original sheet may be hooked at the step or a gap depending on the shape thereof when the original sheet is fed.

Specifically, if a step is formed as the sheet feed tray is arranged lower than the sheet passing surface at the border therebetween, and the original sheet placed on the sheet feed tray is fed to the sheet inlet via the sheet passing surface, the leading end of the original sheet may be hooked easily at the step. If there is a gap instead of the step, the original sheet may enter the gap and may also be hooked.

If the sheet feed tray is arranged higher than the sheet passing surface at the border, a stepped surface formed therebetween does not face the leading end of the sheet. Therefore, in such a case, the original sheet may not be hooked when fed to the sheet inlet.

The similar problem occurs on the sheet discharging side. For example, when the original sheet is discharged from a sheet outlet and fed to a sheet discharge tray via a sheet passing surface, if the sheet passing surface is arranged lower than the sheet discharge tray at the border therebetween, the leading end of the sheet can easily be hooked by the step or gap therebetween.

If the sheet passing surface is arranged higher than the sheet passing surface at the border, a stepped surface formed therebetween does not face the leading end of the sheet. Therefore, in such a case, the original sheet may not be hooked when fed out of the sheet outlet.

As above, it is possible to avoid the problem that the leading end of the sheet is hooked by the stepped portion at the border between two discontinuous surfaces by optimizing the direction of the stepped surface depending on a sheet feeding direction.

Recently, there is a requirement that a single tray is used either as the sheet feed tray or the sheet discharge tray instead of using sheet feed tray and sheet discharge tray separately. When the same tray is used for the both purposes, it is difficult to optimize the direction of the stepped surface referring to the sheet feeding direction.

Specifically, the applicant is considering to employ a feeding device which is configured such that an original sheet is placed on a single sheet feed/discharge tray, the original sheet is fed by an ADF, and the original sheet having been fed is discharged on the sheet feed/discharge tray.

SUMMARY

When such a sheet feed/discharge tray is used, if a tray surface is arranged higher than the sheet passing surface, the original sheet may not be hooked when the sheet is fed inside a device, while the leading end of the sheet may be hooked easily when the sheet is discharged from the device.

On the contrary, if the tray surface is arranged lower than the sheet passing surface, the original sheet may not be hooked when the sheet is discharged from the device, but may be hooked easily when the sheet is introduced in the device.

That is, the direction in which the original sheet travels is reversed between cases where the original sheet is fed in the device and where the original sheet is discharged from the device. If the stepped portion is formed such that the leading end of the original sheet, which is fed in one direction, may not be hooked, it may be hooked easily if fed in the reversed direction. Therefore, when the same tray is used for the sheet feeding/discharging tray, the problem that the leading end of the sheet is hooked by the stepped portion at the border cannot be solved in a conventional way of optimizing the direction of the stepped surface depending on the sheet feeding direction.

In view of the above problem, aspects of the invention provide an improved sheet feeding device in which the above problem is well suppressed or prevented. That is, according to aspects of the invention, regardless whether a sheet is fed from one member to another member in a contact state, or fed in an opposite direction, the leading end of the sheet is prevented from being hooked at a border between the two members, or at least, such a problem is well suppressed. Aspects of the invention also provide an image scanning device employing such a sheet feeding device.

According to aspects of the invention, there is provided a sheet feeding device, which includes a sheet mounting part having a sheet mounting surface on which one or more sheets are mounted, and a sheet feeding unit defining a sheet feed path having an inlet and outlet, the sheet feeding unit being configured to introduce the sheet mounted on the sheet mounting part from the inlet, feed the sheet along the feed path, and discharge the sheet from the outlet on the sheet mounting part.

The sheet mounting part is provided with a first member and a second member arranged next to each other, the first member being arranged at a position opposite to the inlet and the outlet with respect to the second member, a range starting from the first member to the second member passing the border therebetween being defined as the sheet mounting surface. Further, one of the first member and the second member is configured such that an end portion is formed with one or a plurality of protruded portions which is/are protruded toward the other of the first member and the second member, an end portion of the other of the first member and the second member being formed with one or a plurality of slits in which the one or plurality of protruded portions is/are inserted, an upper surface of the other of the first member and the second member being located at a higher position than an upper surface of the one of the first member and the second member at an end position of the protruded portions so that the upper surface of the other of the first member and the second member serving as a part of the sheet mounting surface, the upper surface of the one of the first member and the second member being located at a higher position than the upper surface of the other of the first member and the second member at an end position of the one or plurality of slits so that the upper surface of the one of the first member and the second member serves as a part of the sheet mounting surface.

In the sheet feeding device configured as above, the sheet may be moved to slide from the sheet mounting surface of the first member to the sheet mounting surface of the second member when the sheets, which are to be introduced in a device (e.g., an image scanning device), are placed on the sheet mounting surface. When the sheet having been fed by the sheet feeding unit is discharged from the outlet, the sheet may slide from the sheet mounting surface of the second member to the sheet mounting member of the first member. Thus, the sheet may pass the border between the first member and the second member either from the first member to the second member or from the second member to the first member.

According to another aspect of the invention, there is provided an image scanning apparatus, which is provided with a sheet mounting part having a sheet mounting surface on which one or more sheets to be scanned are mounted, a sheet feeding unit defining a sheet feed path having an inlet and outlet, the sheet feeding unit being configured to introduce the sheet mounted on the sheet mounting part from the inlet, feed the sheet along the feed path, and discharge the sheet from the outlet on the sheet mounting part. The sheet mounting part includes a first member and a second member arranged next to each other, the first member being arranged at a position opposite to the inlet and the outlet with respect to the second member, a range starting from the first member to the second member passing the border therebetween being defined as the sheet mounting surface. Further, one of the first member and the second member is configured such that an end portion is formed with one or a plurality of protruded portions which are protruded toward the other of the first member and the second member, an end portion of the other of the first member and the second member being formed with one or a plurality of slits in which the one or plurality of protruded portions is/are inserted, an upper surface of the other of the first member and the second member being located at a higher position than an upper surface of the one of the first member and the second member at an end position of the protruded portions so that the upper surface of the other of the first member and the second member serving as a part of the sheet mounting surface, the upper surface of the one of the first member and the second member being located at a higher position than the upper surface of the other of the first member and the second member at an end position of the slits so that the upper surface of the one of the first member and the second member serving as a part of the sheet mounting surface.

According to the above configuration, since the image scanning device includes a sheet feeding device similar to one described above, the sheet subjected to be scanned is placed on the sheet mounting surface. Then, the sheets are fed one by one, and scanned. The sheet having been scanned is discharged on the sheet mounting surface again. When the sheet is discharged, the leading end of the sheet is not hooked by the step or gap at the border between the first member and the second member.

DETAILED DESCRIPTION OF AN EMBODIMENT

Hereinafter, referring to the accompanying drawings, an embodiment according to the invention will be described.

Structure of MFP (Multi-Function Peripheral)

Figure 1A:
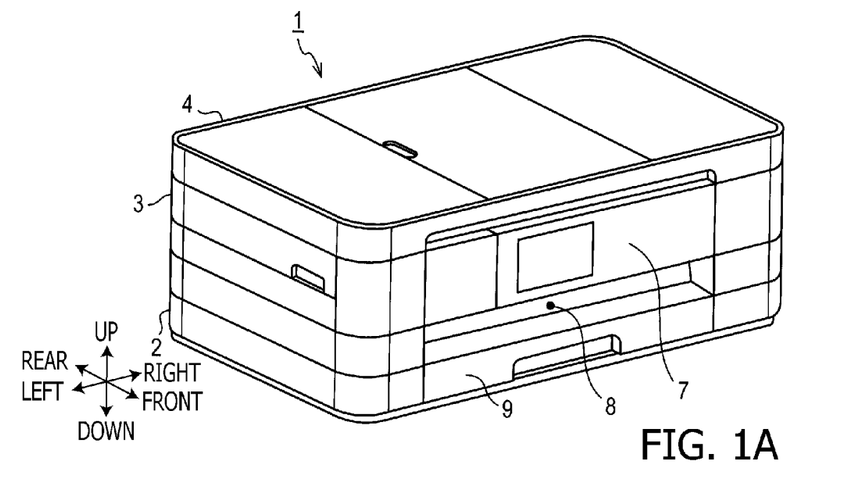
FIG. 1A is a perspective view of an image forming device when an original sheet feeding unit provided above a scanning unit is closed.
Figure 1B:
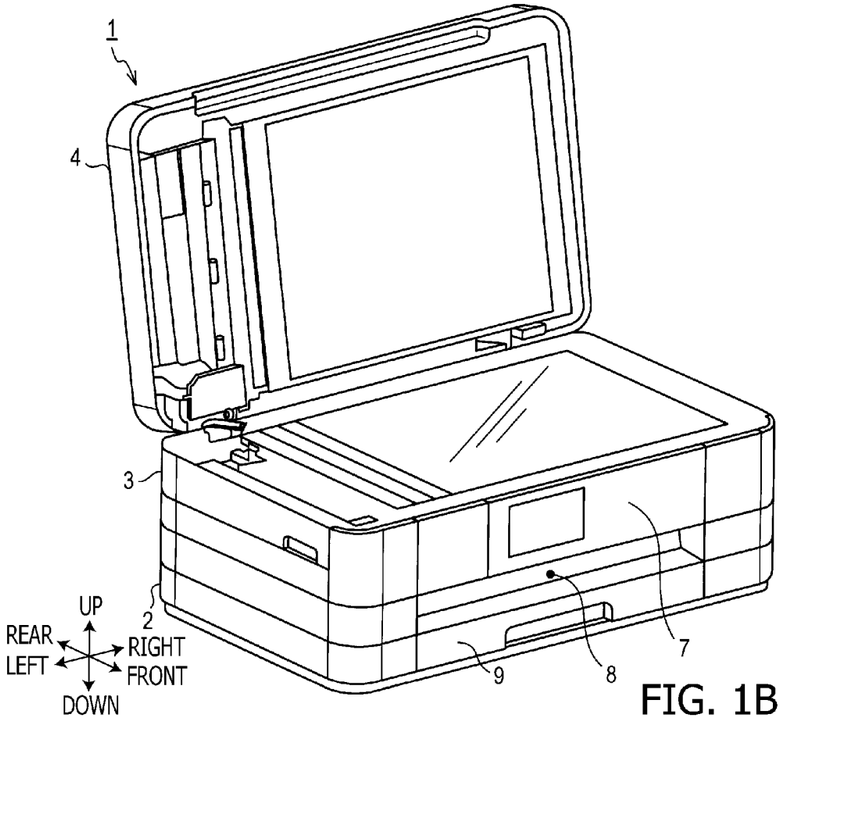
FIG. 1B is a perspective view of the image forming device when the original sheet feeding unit is opened.

As shown in FIGS. 1A and 1B, an MFP (multi-function peripheral) 1 is provided with a main unit 2, a scanning unit 3 mounted above the main unit 2, and an original sheet feed unit 4 provided above the scanning unit 3.

The main unit 2 includes an image forming section, a controller section and power unit. Each mechanism provided in the main unit 2, the scanning unit 3 and the original sheet feeding unit 4 is controlled by the controller section provided to the main unit 2.

The scanning unit 3 is configured to be rotatable with respect to the main unit 2 about an axis that extends in a right-and-left direction at a rear end portion of the main unit 2 and a rear end portion of the scanning unit 3. When the scanning unit 3 is rotated so that the front end portion of the scanning unit 3 is displaced upward, an opening of an upper side of the main unit 2 is exposed to outside. When the scanning unit 3 is opened, a maintenance operation of components (e.g., the image forming section, controller section, power source and etc.) contained in the main unit 2 can be performed.

The original sheet feeding unit 4 is configured to be rotatable with respect to the scanning unit 3 about an axis extending in the right-and-left direction at the rear end portion of the scanning unit 3 and a rear end portion of the original sheet feeding unit 4. With this configuration, the original sheet feeding unit 4 can be displaced between an opened position (as shown in FIG. 1B) and a closed position (as shown in FIG. 1A).

When the original sheet feeding unit 4 is located at the opened position, an original mounting surface which is defined on an upper surface of the scanning unit 3 is exposed to outside. When the original sheet feeding unit 4 is located at the closed position, the original sheet feeding unit 4 serves as a cover that covers the original mounting surface.

On an upper front side of the main unit 2, an operation panel 7 which is operated by a user is provided. Below the operation panel 7, a printed sheet discharge opening 8 from which a printed sheet is discharged is formed. Below the printed sheet discharge opening 8, a sheet feed cassette accommodating a stack of sheets, on which images are to be printed, is provided.

Internal Structure of Scanning Unit and Original Sheet Feeding Unit

Figure 2:
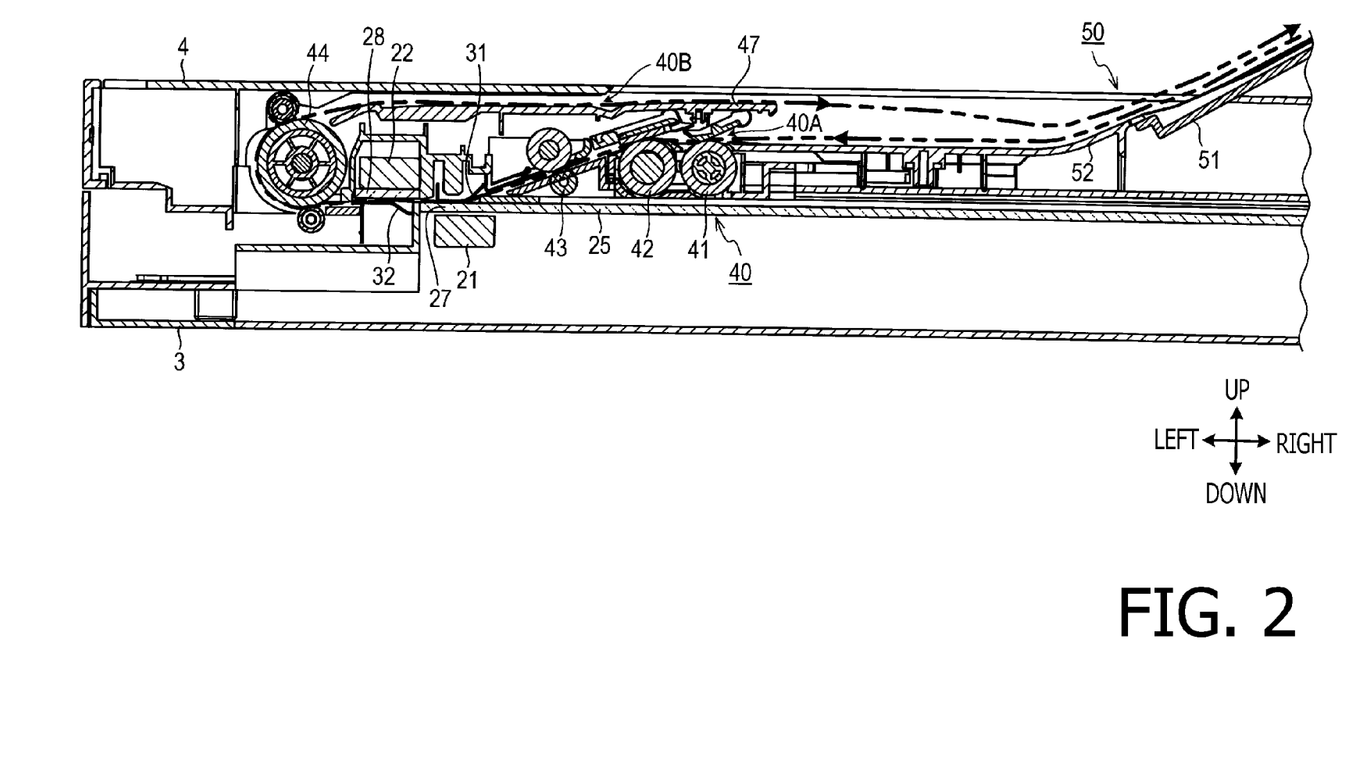
FIG. 2 is a cross-sectional view showing a configuration inside the original sheet feeding unit.

As shown in FIG. 2, the scanning unit 3 is provided with a first image sensor 21, and the original feeding unit 4 is provided with a second image sensor 22. In the exemplary embodiment, a contact image sensor is employed for each of the first image sensor 21 and the second image sensor 22. Each of the first image sensor 21 and the second image sensor is a line sensor extending in a front-and-rear direction (i.e., a main scanning direction).

The first image sensor 21 is configured to be driven by a motor (not shown) and move reciprocally inside the reading unit 3 in a right-and-left direction (i.e., an auxiliary scanning direction). The second image sensor 22 is fixed to a frame provided inside the original sheet feeding unit 4.

The scanning unit 3 is provided with a transparent part 25 for stationary original sheet above the reciprocally moving first image sensor 21, and a first transparent part 27 for a transported (fed) original sheet. Additionally, the original sheet feeding unit 4 is provided with a second transparent part 28 for a transported original sheet below the second image sensor 22.

Both the stationary transparent part 25 and the first transparent part 27 are provided on the upper surface of the scanning unit 3. In this exemplary embodiment, the stationary transparent part 25 and the first transparent part 27 are defined as different areas of a single glass plate. Further, according to the exemplary embodiment, the second transparent part 28 is formed of a glass plate which is different from the stationary transparent part 25 or the first transparent part 27.

It is noted that the stationary transparent part 25 and the first transparent part 27 need not be formed of a single glass plate, and may be formed of different glass plates. Further, each of the stationary transparent part 25, the first transparent par 27 and the second transparent part 28 may be formed of material other than the glass if image can be scanned therethrough by the first image sensor 21 or the second image sensor 22.

The original sheet feeding unit 4 is provided with a first sheet holding part 31 above the first transparent part 27, and the image scanning unit 3 is provided with a second sheet holding part 32 below the second transparent part 28.

The first sheet holding part 31 is urged downward, for example, by a compression spring so that the first sheet holding part 31 slightly presses the upper surface of the first transparent part 27. The second sheet holding part 32 is urged upward, for example, by a compression spring so that the second sheet holding part 32 slightly presses the lower surface of the second transparent part 28.

The original sheet feeding unit 4 is provided with a feeding mechanism 40 configured to feed the original sheets. The feeding mechanism 40 is provided with a group of rollers including a pick-up roller 41, a separation roller 42, a feed roller 43 and a U-turn feed roller 44. With the group of rollers, an original sheet is fed along a feed path which is indicated by two-dotted lines in FIG. 2.

The original sheet feed unit 4 is provided with a cover 47 which covers a part of the feeding mechanism 40 (the pick-up roller 41, the separation roller and the feed roller 43) from the above. A sheet inlet 40A, through which the original sheet is introduced in the feeding mechanism 40, is defined at a position below the cover 47, while a sheet outlet 40B, through which the original sheet is discharged from the feeding mechanism 40, is defined at a position above the cover 47.

Structure of Sheet Tray

Figure 3A:
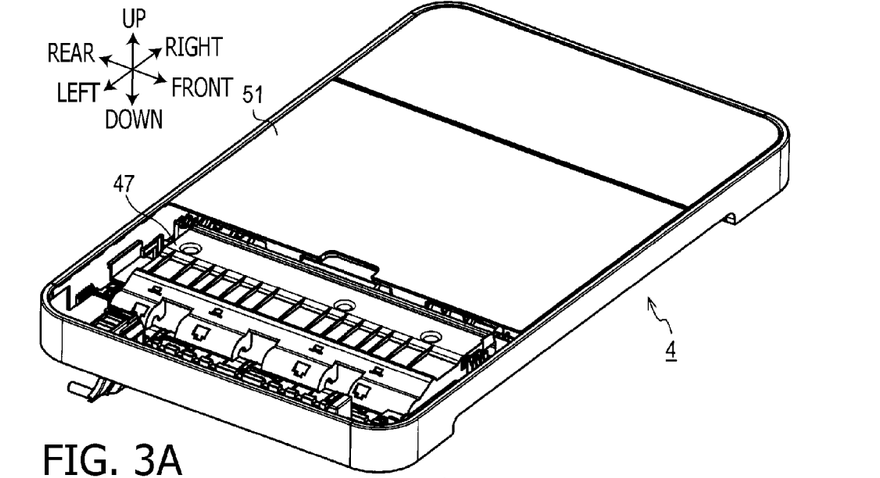
FIG. 3A is a perspective view showing a status where a movable tray part of a sheet tray is closed.
Figure 3B:
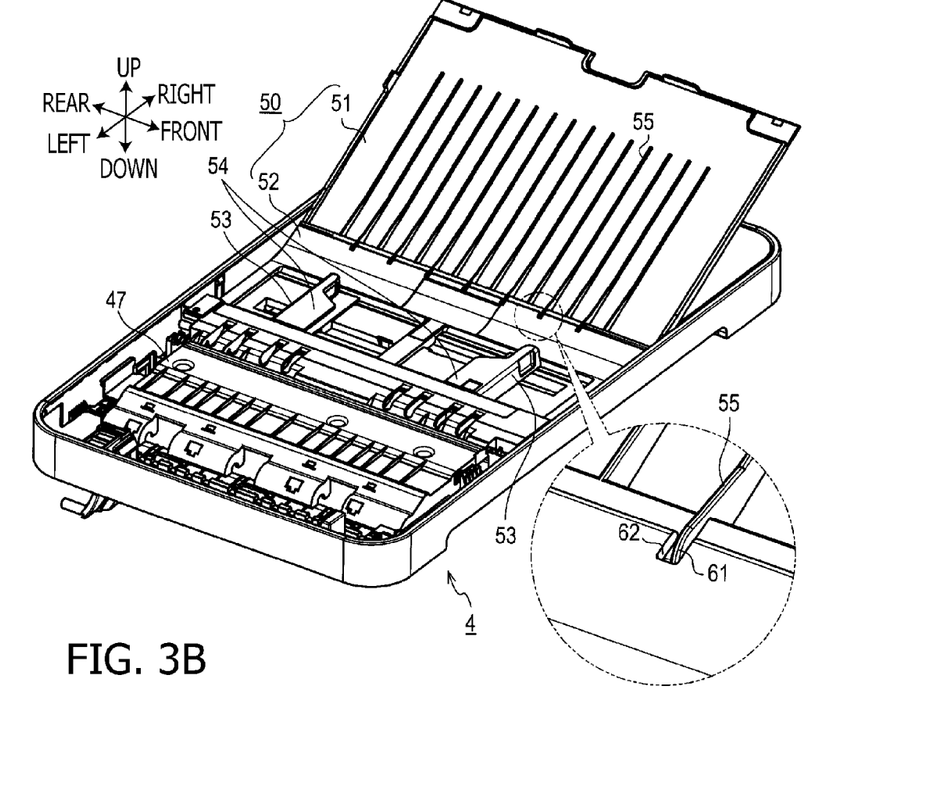
FIG. 3B is a perspective view showing a status where the movable tray part is opened.

On the upper surface of the original sheet feeding unit 4, a sheet tray 50 is provided as shown in FIGS. 3A and 3B. The sheet tray 50 includes a movable (i.e., rotatable) member 51 and a stationary member 52.

The movable member 51 is configured to be movable with respect to the sheet feeding unit 4 about an axis extending in the front-and-rear direction. The movable member 51 is movable between a closed position (see FIG. 3A) and an opened position (see FIG. 3B).

When the movable member 51 is located at the closed position as shown in FIG. 3A, the upper surface of the movable member 51 extends substantially horizontally, and thus the movable member 51 serves as a part of a cover which covers the upper surface of the sheet feeding unit 4. When the movable member 51 is located at the opened position as shown in FIG. 3B, a surface which is the bottom surface when the movable member 51 is located at the closed position is exposed to outside and defines an inclined surface extending in an obliquely upward direction.

When the movable member 51 is rotated and located at the opened position, the stationary member 52, which is covered with the movable member 51 when it is located at the closed position, is uncovered. With the stationary member 52 and the movable member 51 arranged next to each other, the sheet tray 50 is configured. At this state, the movable member 51 is arranged at a position opposite to the sheet inlet 40A and sheet outlet 40B with respect to the stationary member 52. An area from the movable member 51 to the stationary member 52 via a boundary therebetween is used as a surface on which the sheets are placed.

The stationary member 52 is provided with a pair of side guides 53 (see FIG. 3B). The side guides 53 are slidable in the front-and-rear direction. Specifically, the side guides 53 are configured to slidable in association with each other and when one of the side guides 53 is slid by a user, the other slides in an opposite direction. Thus, by moving one of the side guides 53, both the side guides 53 can be moved to approach or separate from each other.

The side guides 53 are provided with parting plates 54, which extend horizontally, from the upper end of the side guides 53, toward each other. The sheets to be fed are placed beneath the parting plates 54, with the side guides 53 being located to contact the sides of the sheets so that the feeding direction of the sheets is regulated. When a sheet has been fed along the feed path, the sheet is fed above the parting plates 54 and then fed to the movable member 51 via the upper surface of the stationary member 52.

The movable member 51 is formed with a plurality of ribs 55 arranged in parallel in the front-and-rear direction, each extending in the sheet feeding direction. According to the exemplary embodiment, there are fifteen ribs 55 formed on the movable member 51. The upper ends of the ribs 55 define a sheet mounting surface. By providing the ribs 55, a gap is formed between the sheet and the upper surface of the movable member 51 so that the contacting area is reduced and a frictional force applied to the sheet is reduced.

According to the exemplary embodiment, a rotational axis side end portion of the sheet mounting surface of the movable member 51 has protruded portions 61 which protrude toward the stationary member 52. Further, the end portion of the stationary member 52 is formed with a plurality of slits 61 in which the protruded portions 61 are inserted, respectively. According to the exemplary embodiment, the protruded portions 61 are formed such that the end portions of some of the ribs 55 are formed to extend toward the stationary member 52. According to the exemplary embodiment, the protruded portion 61 is formed to every two ribs 55. Therefore, there are seven protruded portions 61 according to the exemplary embodiment.

It is noted that the protruded portions may be provided to the end portion of the stationary member 52 and corresponding slits are formed on the end portion of the movable member 51. It is sufficient if protruded portions 61 are formed on the upper surface at the end portion of at least one of the movable member 51 or the stationary member 52, and the slits 62 that receives the protruded portions 61 are formed on the upper side at the end portion of at least the other one of the movable member 51 and the stationary member 52.

According to the exemplary embodiment, the protruded portions 61 and the corresponding slits 62 are formed at a plurality of positions (e.g., seven positions) within a range corresponding to the maximum width of the sheet that can be fed by the sheet feeding mechanism 40. In FIG. 3B, one set of the protruded portion 61 and the slit 62 are shown in an enlarged manner. According to the exemplary embodiment, the other six sets of the protruded portions 61 and the slits 62 have the similar shapes and structures.

Figure 4A:
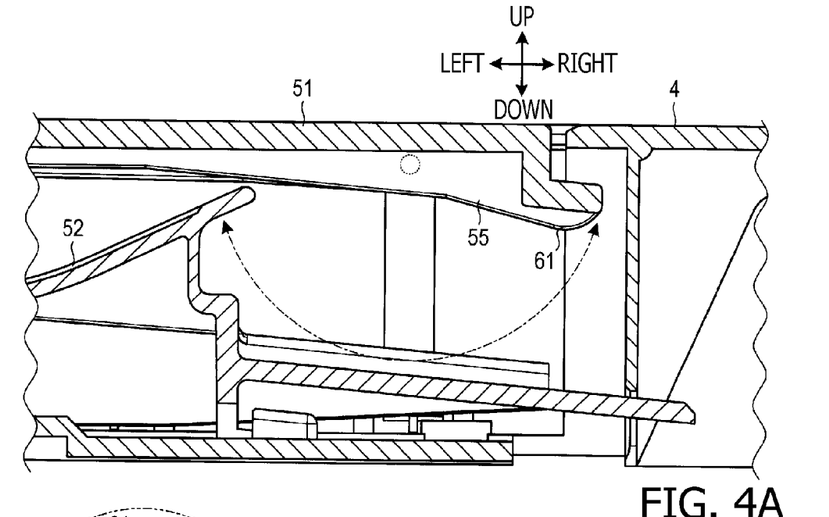
FIG. 4A is a cross-sectional view showing a positional relationship between protruded portions formed on the movable tray part and concave portions formed on a stationary tray part of the sheet tray, when the movable tray part is closed.
Figure 4B:
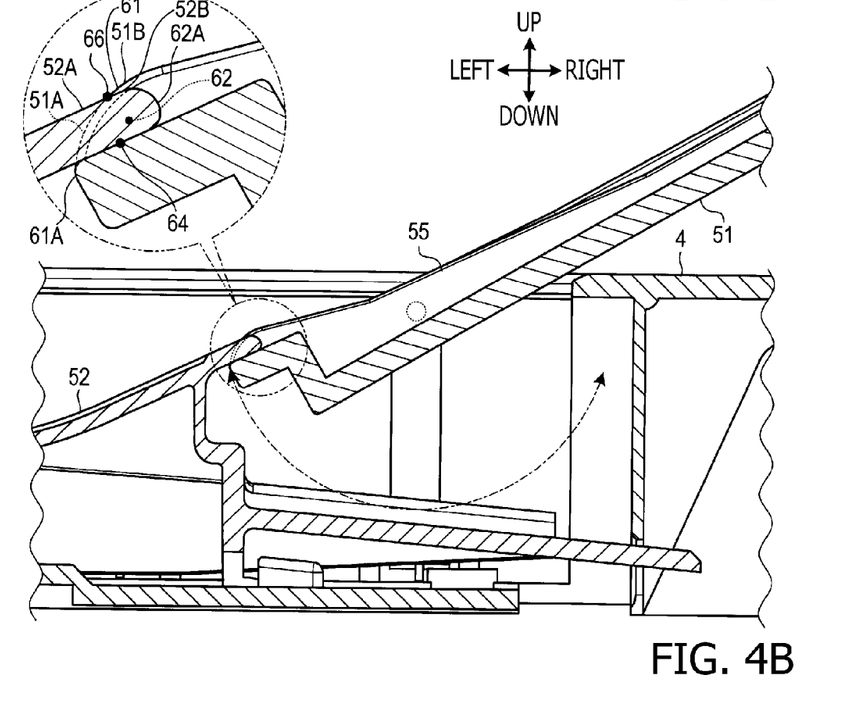
FIG. 4B is a cross-sectional view showing a positional relationship between the protruded portions and the concave portions when the movable tray part is opened.

The protruded portions 61 and the slits 62 are separated from each other when the movable member 51 is located at the closed position (see FIG. 4A). When the movable member 51 is located at the opened position as shown in FIG. 4B, the protruded portions 61 are inserted in the slits 62 from the lower side and fit with each other as shown in FIG. 3B and FIG. 4B. When the movable member 51 is located at the opened position, the protruded portions 61 is slightly protruded from the slits 62 as shown in FIG. 4B and in the enlarged view therein.

At this state, the end portion of the movable member 51 contacts the end portion of the stationary member 52 so that the movable member 51 is accurately located at the opened position (see FIG. 4B). Specifically, at an end position 61A of the protruded portions 61, the upper surface 52A of the stationary member 52 is above (i.e., at a higher position than) the upper surface 51A of the movable member 51. Further, at an end position 62A of the stationary member 52 where the slits 62 are formed, the upper surface 51B of the movable member 51 is above (i.e., at a higher position than) the upper surface 52B of the stationary member 52.

Since the protruded portions 61 and the slits 62 described above are provided, it is possible to prevent the leading end of the sheet from being hooked at the border between the movable member 51 and the stationary member 52, or at least such a problem is suppressed.

For example, when the original sheets to be introduced through the inlet 40A are placed on the sheet mounting surface, the sheets may be slid from the movable sheet member 51 to the stationary sheet member 52.

In such a case, the leading end of the sheet which is fed along the sheet mounting surface of the movable member 51 to the stationary member 52 is guided by the protruded portions 61 (i.e., the upper surface 51B of the movable member 51) and reaches a position passing the end 62A of the slits 62. Then, on a downstream side with respect to a position where the height of the protruded portions 61 and the upper surface 52A of the stationary member 52 coincide with each other, the sheet is guided by the upper surface 52A of the stationary member 52. Thus, the sheet is guided from the movable member 51 to the stationary member 52 without being hooked by the end portion of the stationary member 52.

When the original sheet having been fed by the sheet feeding mechanism 50 is discharged from the outlet 40B, the sheet may be slid from the stationary member 52 to the movable member 51. In such a case, the leading end of the sheet which is fed along the sheet mounting surface of the stationary member 52 to the movable member 51 is guided by the upper surface 52A of the stationary member 52 and reaches a position passing the end 61A of the protruded portions 61. Then, on a downstream side with respect to a position where the height of the protruded portions 61 and the upper surface 52A of the stationary member 52 coincide with each other, the sheet is guided by the upper surface 51A of the movable member 51 (i.e., by the protruded portions 61).

As described above, according to the exemplary embodiment, an area from the upper surface 51B of the movable member 51 to the upper surface 52A of the stationary member 52 via the border position 66 is used as the sheet mounting surface. With this configuration, the leading end of the sheet in the feeding direction is not hooked at the border between the movable member 51 and the stationary member 52 and moves smoothly regardless whether the sheet is fed from the movable member 51 to the stationary member 52, and vice versa.

As described above, in the MFP 1 according to the exemplary embodiment, since the protruded portions 61 and the slits 62 are formed, it is possible to prevent the leading end of the sheet from being hooked at the border between the movable member 51 and the stationary member 52, or at least such a problem is suppressed, even though the sheet mounting area is defined as an area from the movable member 51 to the stationary member 52 via the border therebetween.

In the MFP 1 according to the exemplary embodiment, the sheet mounting surface is defined by upper ends of a plurality of ribs. Therefore, contact areas between the sheet mounting surface and the sheet can be reduced in comparison with a case where the ribs are not provided, and frictional force between the sheet mounting surface and the sheet can be reduced. Further, merely by extending the ribs 55, the protruded portions 61 are formed, with which it becomes possible to prevent the leading end of the sheet from being hooked at the border between the movable tray and the stationary tray, or at least such a problem is suppressed.

According to the exemplary embodiment, the protruded portions 61 and the slits 62 are configured to guide the sheet at a plurality of positions within a range corresponding to the widest sheet that can be used. Therefore, regardless of whether the sheet is relatively small in size, which is guided by some of the protruded portions 61 and the slits 62 or the sheet is large in size, which is guided by most or all of the protruded portions 61 and the slits 62, it is possible to prevent the leading end of the sheet from being hooked by a step or gap between the movable member 51 and the stationary tray 2.

Further, according to the MFP 1, by moving the movable member 51 to the closed position when the MFP 1 is not used, the height of the MFP 1 can be lowered. Further, since the movable member 51 is configured to be movable, a gap/step is formed between the movable member 51 and the stationary member 52. However, according to the exemplary embodiment, by forming the protruded portions 61 and the slits 62 as described above, it has become possible to prevent the leading end of the sheet from being hooked at the gap and/or step formed therebetween, or at least suppress such a problem.

In the MFP 1 according to the exemplary embodiment, when the movable member 51 is rotated from the closed position to the opened position, the protruded portions 61 are inserted in the slits 62 from below and are appropriately arranged. Thus, with a simple operation to open the movable member 51, it becomes possible to prevent the leading end of the sheet from being hooked at the step or gap formed at the border between the movable member 51 and the stationary member 52, or at least suppress such a problem.

In the MFP 1 according to the exemplary embodiment, when the movable member 51 is opened, positioning of the movable member 51 is done as it contacts the stationary member 52. Therefore, it is unnecessary to provide a stopper for positioning the movable member 51 and the structure of the MFP 1 can be simplified.

It is noted that the present invention needs not be limited to the configuration of the above-described embodiment. Various modifications can be made without departing from the scope of the invention.

For example, according to the above-described embodiment, the sheet feeding device is described to be incorporated in the image scanning device as an example of the same. The sheet feeding device according to the invention can be used for an image forming device which is configured to form an image on a sheet fed by the sheet feeding device.

In the exemplary embodiment, an image scanning device which is a part of an MFP is described as an example. It should be noted that the image scanning device needs not be limited to a part of the MFP but a single-function image scanner. Optionally, the sheet feeding device can be employed in an image forming device.

In the exemplary embodiment, the movable member 51 is configured to be rotatable. It should be noted that the movable tray needs not be limited to a rotatable one. The movable tray may be a slidable tray, or removable tray that is removably attached to the image scanning device. Even in such a case, if the protruded portions 61 and the slits 62 or corresponding structures are employed, it is possible to prevent the leading end of the sheet from being hooked at the step or gap formed between the movable tray and the stationary tray, or at least suppress such a problem.

In the exemplary embodiment, the stationary member 52 is fixed to the MFP 1. However, the invention needs not be limited to such a structure. That is, the sheet tray may include two movable parts. As far as the protruded portions 61 and the slits 62 as described above are formed to the two movable parts, it is possible to prevent the sheet from being hooked at the step or gap formed therebetween.

The number and/or size of the protruded portions 61 and slits 62 may be determined appropriately within a certain range so that the leading end of the sheet is not hooked at the step or gap formed between the two components of the sheet tray. Further, the interval of the plurality of protruded portions and the slits should also be determined appropriately so as to suppress or prevent the leading end of the sheet from being hooked at the step or gap between the two components of the sheet tray.

In the above-described exemplary embodiment, the movable member 51 is configured to rotatable about a rotational axis. However, the invention should not be limited to such a structure, and the movable member may be configured to move in a different way.

In the above-described exemplary embodiment, a plurality of protruded portions 61 and slits 62 are formed. However, the invention should not be limited to such a structure, and even if one protruded portion and one slit are formed, it is prevented or suppressed that the sheet is hooked at the step or gap between the two components of the sheet tray.

In the above-described exemplary embodiment, a plurality of ribs are formed. However, the invention should not be limited to such a structure, and only one rib may be formed on the movable member.

What is claimed is:

1. A sheet feeding device, comprising:
   a sheet mounting part having a sheet mounting surface on which one or more sheets are mounted; and
   a sheet feeding unit defining a sheet feed path having an inlet and outlet, the sheet feeding unit being configured to:
      introduce the sheet mounted on the sheet mounting part from the inlet;
      feed the sheet along the feed path; and
      discharge the sheet from the outlet on the sheet mounting part,
   wherein the sheet mounting part comprises a first member and a second member arranged next to each other, the first member being arranged at a position opposite to the inlet and the outlet with respect to the second member, the sheet mounting surface comprising a range from the first member to the second member and passing a border therebetween,
   wherein one of the first member and the second member is configured such that an end portion is formed with at least one protruded portion that protrudes toward the other of the first member and the second member, an end portion of the other of the first member and the second member being formed with at least one slit in which the at least one protruded portion is inserted, an upper surface of the other of the first member and the second member being located at a higher position than an upper surface of the one of the first member and the second member at an end position of the at least one protruded portion so that the upper surface of the other of the first member and the second member serves as a part of the sheet mounting surface, the upper surface of the one of the first member and the second member being located at a higher position than the upper surface of the other of the first member and the second member at an end position of the at least one slit so that the upper surface of the one of the first member and the second member serves as a part of the sheet mounting surface.

2. The sheet feeding device according to claim 1, wherein the one of the first member and the second member is formed with at least one rib extending in a direction parallel to a direction in which the sheet is fed by the sheet feeding unit, an upper end of the at least one rib defining a part of the sheet mounting surface, the at least one protruded portion being formed by extending the at least one rib toward the other of the first member and the second member.

3. The sheet feeding device according to claim 2, wherein the first member is configured to be movable between a first position and a second position, the first member being located at a lower position when the first member is located at the first position than when the first member is located at the second position, the first member being arranged to be next to the second member and located at an opposite position to the inlet and the outlet with the second member located therebetween so that the sheet mounting surface is defined by the first member and the second member including a border therebetween when the first member is located at the second position.

4. The sheet feeding device according to claim 3, wherein the at least one slit is formed to have a portion penetrating in an up-and-down direction, the at least one protruded portion being inserted through the at least one slit from the below when the first member is moved from the first position to the second position.

5. The sheet feeding device according to claim 3, wherein the first member is positioned at the second position as the first member contacts the second member when the first member is moved from the first position toward the second position.

6. The sheet feeding device according to claim 5, wherein the inlet of the feed path is below the outlet of the feed path.

7. The sheet feeding device according to claim 6, wherein each of the sheet fed into the inlet and the sheet discharged from the outlet contacts the border.

8. The sheet feeding device according to claim 3, wherein the first member is rotatable about a rotation axis located between the first position and the second position.

9. The sheet feeding device according to one of claim 3 or claim 8, wherein the first member covers an upper surface of the second member when the first member is located at the first position.

10. The sheet feeding device according to claim 1, wherein the at least one protruded portion comprises a plurality of protruded portions, and wherein the at least one slit comprises a plurality of slits.

11. The sheet feeding device according to claim 10, wherein the one of the first member and the second member is formed with a plurality of ribs extending in a direction parallel to a direction in which the sheet is fed by the sheet feeding unit, upper ends of the plurality of the ribs defining a part of the sheet mounting surface, the plurality of protruded portions being formed by extending the plurality of ribs toward the other of the first member and the second member.

12. The sheet feeding device according to one of claim 10 or claim 11, wherein the plurality of protruded portions and the plurality of slits are arranged at a plurality of positions in a width direction, the width direction comprising a direction perpendicular to a sliding direction of the sheet on the sheet mounting surface and perpendicular to a thickness direction of the sheet, within a range corresponding to a width of the sheet having a maximum usable width.

13. The sheet feeding device according to claim 10, wherein the first member is movable between a first position and a second position, the first member being located at a lower position when the first member is located at the first position than when the first member is located at the second position, the first member being arranged to be next to the second member and located at an opposite position to the inlet and the outlet with the second member located therebetween so that the sheet mounting surface is defined by the first member and the second member including a border therebetween when the first member is located at the second position.

14. The sheet feeding device according to claim 13, wherein the plurality of slits are formed to have a portions penetrating in an up-and-down direction, the plurality of protruded portions being inserted through the plurality of slits from the below when the first member is moved from the first position to the second position.

15. The sheet feeding device according to claim 13, wherein the first member is positioned at the second position as the first member contacts the second member when the first member is moved from the first position toward the second position.

16. The sheet feeding device according to claim 1, wherein one of the first member and the second member is rotatable with respect to the sheet feeding unit about an axis extending in the front-and-rear direction.

17. An image scanning device, comprising:
   a sheet mounting part having a sheet mounting surface on which one or more sheets to be scanned are mounted; and
   a sheet feeding unit defining a sheet feed path having an inlet and outlet, the sheet feeding unit being configured to:
      introduce the sheet mounted on the sheet mounting part from the inlet;
      feed the sheet along the feed paths; and
      discharge the sheet from the outlet on the sheet mounting part,
   wherein the sheet mounting part comprises a first member and a second member arranged next to each other, the first member being arranged at a position opposite to the inlet and the outlet with respect to the second member, the sheet mounting surface comprising a range from the first member to the second member and passing a border therebetween,
   wherein one of the first member and the second member is configured such that an end portion is formed with at least one protruded portion that protrudes toward the other of the first member and the second member, an end portion of the other of the first member and the second member being formed with at least one slit in which the at least one protruded portion is inserted, an upper surface of the other of the first member and the second member being located at a higher position than an upper surface of the one of the first member and the second member at an end position of the at least one protruded portion so that the upper surface of the other of the first member and the second member serves as a part of the sheet mounting surface, the upper surface of the one of the first member and the second member being located at a higher position than the upper surface of the other of the first member and the second member at an end position of the at least one slit so that the upper surface of the one of the first member and the second member serves as a part of the sheet mounting surface.

18. The image scanning device according to claim 17, wherein the at least one protruded portion comprises a plurality of protruded portions, and wherein the at least one slit comprises a plurality of slits.

19. The image scanning device according to claim 17, wherein one of the first member and the second member is rotatable with respect to the sheet feeding unit about an axis extending in a front-and-rear direction.

* * * * *